United States Patent
Tseng et al.

(10) Patent No.: US 12,488,433 B2
(45) Date of Patent: Dec. 2, 2025

(54) IMAGE NOISE AND BLURRINESS REDUCTION

(71) Applicant: MediaTek Inc., Hsinchu (TW)

(72) Inventors: Chao-Yue Tseng, Hsinchu (TW); Chi-Cheng Ju, Hsinchu (TW); Ying-Jui Chen, Hsinchu (TW); Keh-Tsong Li, Hsinchu (TW); Jia-Ying Lin, Hsinchu (TW); Pin-Wei Chen, Hsinchu (TW)

(73) Assignee: MediaTek Inc. (TW)

( * ) Notice: Subject to any disclaimer, the term of this patent is extended or adjusted under 35 U.S.C. 154(b) by 705 days.

(21) Appl. No.: 17/735,098

(22) Filed: May 2, 2022

(65) Prior Publication Data

US 2023/0351552 A1    Nov. 2, 2023

(51) Int. Cl.
*G06T 5/70* (2024.01)
*G06T 7/215* (2017.01)

(52) U.S. Cl.
CPC ............... *G06T 5/70* (2024.01); *G06T 7/215* (2017.01); *G06T 2207/10016* (2013.01); *G06T 2207/20021* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 11,676,250 | B1* | 6/2023 | Price | G06T 3/4015 348/239 |
| 2006/0269155 | A1* | 11/2006 | Tener | G06T 7/337 382/243 |
| 2023/0316463 | A1* | 10/2023 | Nishimura | G06T 5/70 382/260 |

OTHER PUBLICATIONS

Nimisha, T. M., A. N. Rajagopalan, and Rangarajan Aravind. "Generating high quality pan-shots from motion blurred videos." Computer Vision and Image Understanding 171 (2018): 20-33. (Year: 2018).*

* cited by examiner

*Primary Examiner* — Matthew C Bella
*Assistant Examiner* — Johnny B Duong
(74) *Attorney, Agent, or Firm* — Andy M. Han; Han IP PLLC

(57) ABSTRACT

Various schemes pertaining to generating an output image using hybrid motion-compensated fusion techniques are described. An apparatus receives multi-frame data comprising a plurality of images consecutively captured. The apparatus subsequently generates a first intermediate image and a second intermediate image by performing temporal fusion on a first part and a second part of the multi-frame data, respectively. The apparatus further generates the output image using motion-compensated fusion based on the first and second intermediate images. The apparatus provides benefits of efficiently reducing noise and blurriness in the output image.

21 Claims, 11 Drawing Sheets

IMAGE NOISE AND BLURRINESS REDUCTION

TECHNICAL FIELD

The present disclosure is generally related to digital photography and, more particularly, to methods and apparatus for reducing noise and blurriness presented in a digitally captured image using multi-frame image fusion techniques.

BACKGROUND

Unless otherwise indicated herein, approaches described in this section are not prior art to the claims listed below and are not admitted as prior art by inclusion in this section.

Photography traditionally involves a camera capturing on a film, through exposure, an image of a scene containing real-world objects. Specifically, the film is exposed to visible light signals originated, reflected, or refracted from the real-world objects for a period of time that is determined or otherwise set by the camera. The period of time is often referred as "exposure time", or simply "exposure", which may be set by a shutter speed setting of the camera. During the exposure, the visible light signals provide photonic energy to imprint the image on the film by activating reception chemicals thereon. The image would be sharp and clear when the real-world objects are relatively stationary with respect to the film during the exposure. However, in an event of a sensible movement during the exposure, the image captured would be blurry. The sensible movement may result from a high-speed moving object to be captured (e.g., a highspeed train or a running waterfall), or from a non-still film (e.g., movement of camera when the shutter is pressed). Due to the relative movement between the object to be captured and film in the camera during exposure, the resulted image is blurry.

In addition to the problem of blurriness, film photography is also subject to noise problems. Noise in an image represents elements in the image that are not desirable. For example, photon noise, sometimes called "shot noise", may present due to the very nature that photons, which are in the light signals coming from the objects, arrive at the film in packets that reach the film at random intervals. This randomness of the arrival of the packets of photons is manifested as unwanted noise that is captured on the film.

Contemporary digital image capturing devices, such as digital still cameras, digital camcorders, cell phone cameras, surveillance cameras, etc., are not immune to the problems of noise and blurriness as described above in the context of conventional film photography. In fact, the problems may be worse in the realm of digital photography. Instead of using a film, contemporary digital image capturing devices capture images of the real world using a sensor array having a plurality of sensing elements, or pixel sensors, that are able to sense or otherwise detect the visible light signals. The sensor array may comprise an array of photodetectors realized by charged coupled device (CCD) or complementary metal-oxide semiconductor (CMOS) technologies. The use of the sensor array actually adds to the noise captured in the resulted image. For example, the sensor array is subject to so-called thermal noise, which is intrinsic in the sensing elements thereof and increases exponentially as the operating temperature of the senor array rises. In addition, a digital image capturing device is required to have readout circuitry that reads the output of the sensor array. Like all other electronic circuits, the readout circuitry is subject to various random noise sources inherent in the electronics that collectively give rise to a noise referred as "read noise". Moreover, other noise sources in the ambient environment, such as electromagnetic waves, may cause noise in a digitally captured image.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to reducing noise and blurriness in a still image. It is believed that with the various embodiments in the present disclosure, benefits including enhanced image quality especially under low light conditions, a lower image noise level, and/or reduced hardware overhead are achieved.

In one aspect, a method is presented for generating a still image of reduced noise and blurriness using multi-frame data, which may include a plurality of images of a scene that are captured by a digital camera consecutively over a period of time (e.g., exposure time). The method may involve receiving the multi-frame data, followed by generating a first intermediate image using a first part of the multi-frame data. Specifically, the intermediate image may be generated by performing temporal fusion on a first number of the plurality of images of the multi-frame data. In some embodiments, the first number of the plurality of images may be among the earliest images captured during the exposure time. The method may subsequently involve generating a second intermediate image by performing motion-compensated fusion based on a second part of the multi-frame data that may include the captured images that are not among the first part of the multi-frame data. The method may further involve generating an output image by performing motion-compensated fusion based on the first intermediate image and the second intermediate image. The resulted output image would exhibit significantly reduced noise and blurriness as compared to any single image within the multi-frame data. In some embodiments, the first part of the multi-frame data would include more images than the second part of the multi-frame data.

In another aspect, an apparatus is presented which comprises a processor, a temporal fusion module, and a motion-compensated (MC) fusion module. The processor is configured to configured to receive multi-frame data of a scene, wherein the multi-frame data includes a plurality of images of the scene that are consecutively captured during a period of time. The temporal fusion module is configured to generate a first intermediate image by performing temporal fusion based on a first part of the multi-frame data comprising a first number of the plurality of images. Furthermore, the motion MC fusion module is configured to generate an output image of the scene by performing motion-compensated fusion based on the first intermediate image and a second part of the multi-frame data comprising a second number of the plurality of images. In some embodiments, the first number is greater than the second number.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to reducing noise and blurriness in a digitally captured image using multi-frame image fusion. According to the present disclosure, a number of possible solutions may be implemented separately or jointly. That is, although these possible solutions may be described below separately, two or more of these possible solutions may be implemented in one combination or another.

I. Temporal Fusion

Digital image capturing devices are subject to various noise sources, which translate to noise presented in the resulted digital images. As described above, digital photography may be subject to more noise sources than traditional film photography. Nevertheless, digital photography also provides new venues of noise reduction that are not available to film photography. For example, a digital camera can easily capture, obtain or record a multi-frame shot at a scene, as there is almost no overhead for repeatedly capturing pictures of a same scene aside from memory or storage that is needed for storing the captured pictures. By the term "multi-frame", in the present disclosure, it means multiple images, also referred as "frames", are consecutively captured or otherwise recorded in a relative short period of time, which may be triggered by a single press on an activating button of the digital camera. Given the high operation speed of contemporary electronics, a digital camera is often capable of producing multi-frame shots at a rate of 30 or 60 frames per second (fps), or at an even higher rate. As described in detail below, the frames, i.e., the multiple images of a same scene generated by a multi-frame shot, can be combined or otherwise processed to produce an image of the scene with significantly reduced noise as compared to an image generated from a single-frame shot of the scene.

Figure 1:
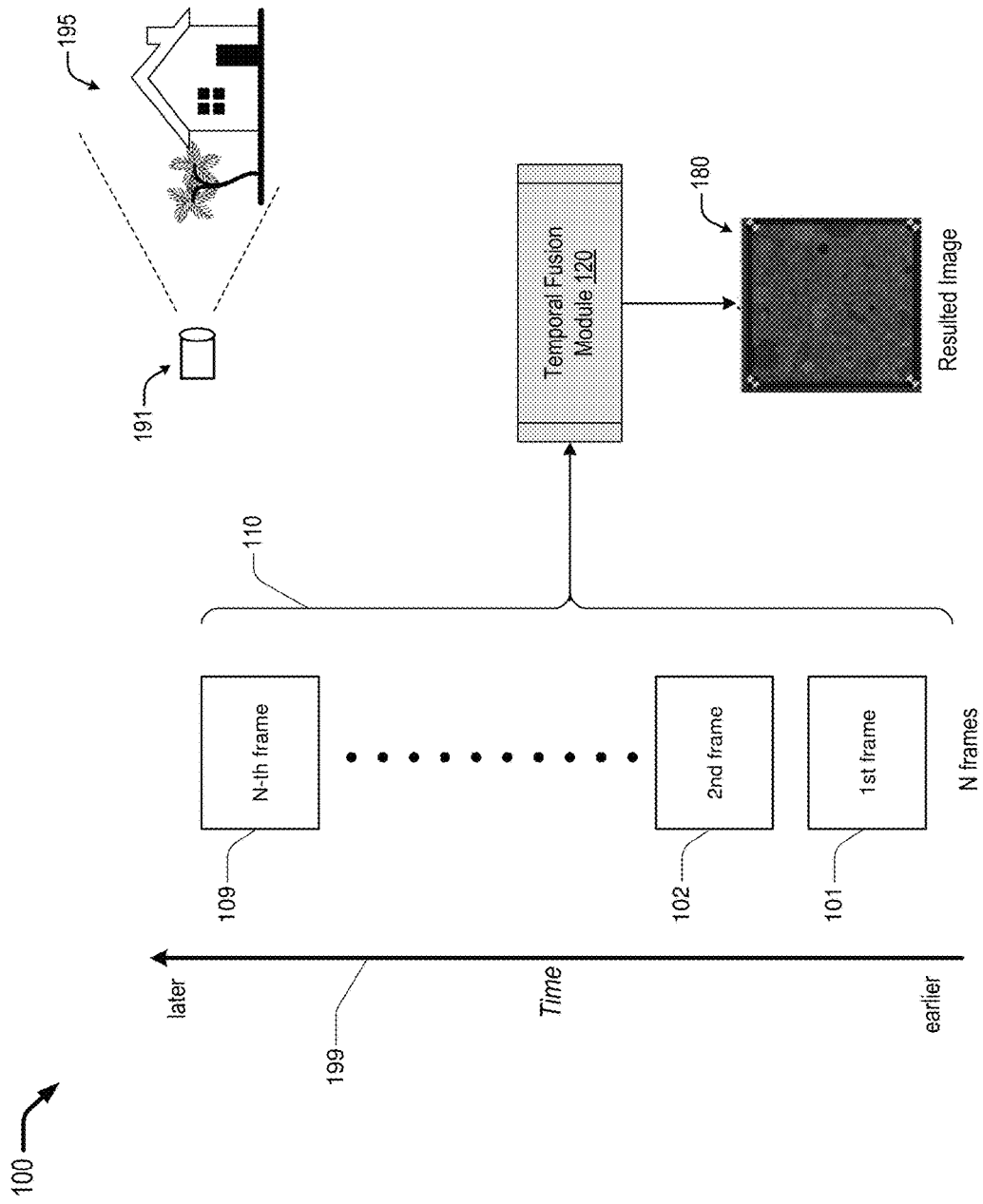
FIG. 1 is a diagram of an example design in accordance with an implementation of the present disclosure.

FIG. 1 is a diagram of an example design in accordance with an implementation of the present disclosure, wherein a temporal fusion process 100 is performed with multi-frame data 110 of a scene 195. The multi-frame data 110 is captured, likely by a digital camera or a cell phone camera 191. As shown in FIG. 1, the multi-frame data 110 includes a total number of N frames, or N images, such as a first frame 101, a second frame 102, and an N-th frame 109. Each of the images 101, 102, . . . , 109 records a snapshot of the scene 195 at a particular moment in time. The N images of the multi-frame data 110 are sequentially captured, i.e., captured consecutively in time, by the camera 191 during a period of time represented by a timeline 199, which indicates that the first frame 101 is the earliest frame captured in the multi-frame data 110, followed by the second frame 102, . . . , etc., whereas the N-th frame 109 is the last frame captured during the time that the camera 191 captures the multi-frame data 110. The exact number of N depends on the shutter speed of the camera 191 as well as the total exposure time represented by the timeline 199. Assuming that the digital camera 191 is designed to complete the capturing of the multi-frame data 110 within 1 second from the pressing of a key or button on the camera 191, N would thus be 60 provided that the shutter speed of the camera 191 is set at 60 frames per second (fps). That is, with this setting, there are 60 images in the multi-frame data 110. In an event that the shutter is set to a slower speed of 30 fps, the multi-frame data 110 would then have only 30 frames, i.e., N=30.

All the images of the multi-frame data 110 are sent to a temporal fusion module 120, which is configured to perform the temporal fusion process 100 on the multi-frame data 110. The temporal fusion process 100 may reduce the noise in a way similar to how film photography utilizes long exposure techniques to reduce image noise. In general, using the images of the multi-frame data 110 as input, the temporal fusion module 120 performs a pixel-by-pixel operation, often referred as temporal blending or temporal filtering, to generate an output image 180. Namely, the pixel value of the resulted image 180 at any specific pixel location is calculated using the pixel values of the images of the multi-frame data 110 at the same exact pixel location. The temporal fusion module 120 may be configured to implement the temporal fusion process 100 in various ways in which the noise components of the plurality of images in the multi-frame data 110 may cancel each other at least for the most part. For example, given the randomness of most of the noise sources, as stated elsewhere herein above, the temporal fusion module 120 may simply perform a pixel-by-pixel mean average operation over the plurality of images in the multi-frame data 110 to remove a significant portion of the total noise presented in the resulted image 180. As another example, in an event that certain noise is deterministic, for instance, to be more prominent immediately after the activation button is pressed (e.g., noise introduced by pressing the activation button), the temporal fusion module 120 may try to filter out this noise by performing a weighted average, giving weights of lower values to the frames captured immediately after pressing the button, and weights of higher values to the frames captured later, i.e., frames captured after sometime from pressing the button. In some embodiments, the temporal fusion module 120 may simply add up most or all of the frames to form the resulted image 180, e.g., when the multi-frame data 110 is captured under low light conditions, wherein the signal intensity of each frame is already low to begin with.

Figure 2:
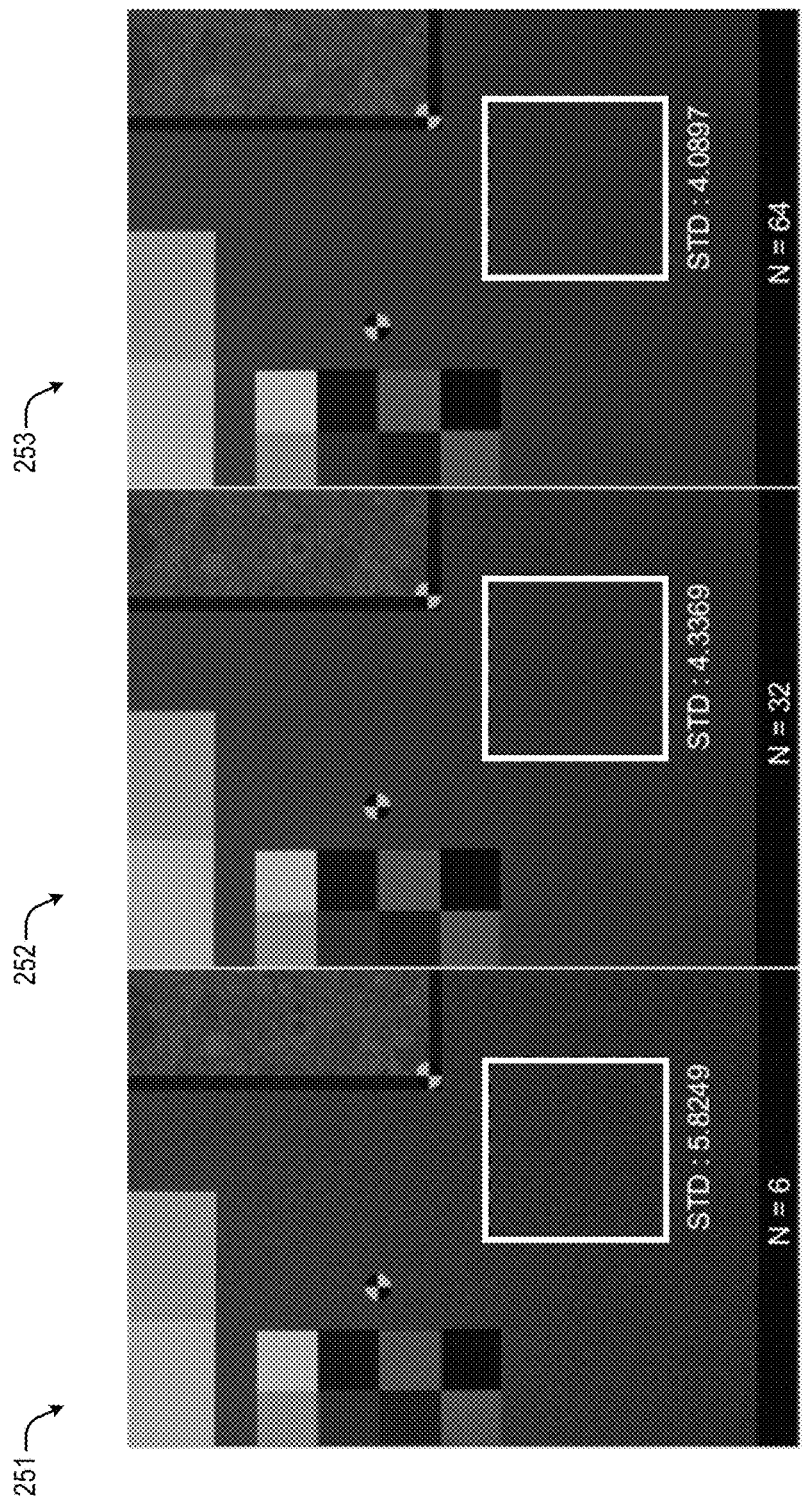
FIG. 2 is a diagram demonstrating exemplary output images resulted from the example design in of FIG. 1.

FIG. 2 is a diagram demonstrating exemplary output images 251, 252 and 253, each representing a respective embodiment of the output image 180 generated by the temporal fusion module 120. Specifically, the output images 251, 252 and 253 are embodiments of the output image 180 with N=6, 32 and 64, respectively, wherein N is the total number of frames in the multi-frame data 110, and wherein all the N frames are utilized by the temporal fusion module 120 that performs a pixel-by-pixel mean average to generate the output images 251, 252 and 253. As shown in FIG. 2, a higher N value results in a higher image quality, which is manifested in fewer noise points and more detailed texture, as more noise components are canceled out in the temporal fusion process 100 with a larger N, and thus less noise is presented in the resulted output image. A higher image quality is indicated in FIG. 2 with a lower standard deviation (STD) number, which represents the standard deviation of the pixel values within the respective rectangular area indicated in each of the output images 251, 252 and 253.

It is worth noting that the successful noise reduction achieved in FIG. 2 is based on an assumption that the scene 195 that the multi-frame data 110 records is relatively static, with few moving parts presented therein. In fact, each of the output images 251, 252 and 253 results from performing the design of FIG. 1 with the scene 195 being a benchmarking scene that includes mostly static objects. Namely, the objects represented in the output images 251, 252 and 253 move very little during the period of time between the capturing of the first frame 101 and the N-th frame 109. In an event that the scene 195 contains some relatively dynamic objects, i.e., objects that move in their physical locations during the period of time between the capturing of the first frame 101 and the N-th frame 109, the temporal fusion 120 would then result in blurry output image 180 in the vicinity of the pixel locations corresponding to the dynamic objects due to the object movement. Moreover, an increase in N would not help improving the blurriness. As shown in FIG. 1, the scene 195 may include a brick house and a willow tree. On a calm day with sufficient daylight and little or no breeze, both the tree and the house may be considered "static objects", as little movement the tree would be recorded in the multi-frame data 110, whereas the house is apparently not moving. Accordingly, in the resulted image 180, both the house and the tree would be clear with little blurriness and noise. On a windy day with dim ambient light, however, the branches of the willow tree would move relatively significantly due to the wind blowing it, and thus become "dynamic objects" as captured in the multi-frame data 110, although the brick house would still remain as a static object. Accordingly, in the resulted image 180, the house may still remain largely clear, but the tree may become blurry as the temporal fusion module 120 is not capable of handling the dynamic objects adequately.

II. Motion-Compensated Fusion

Figure 3:
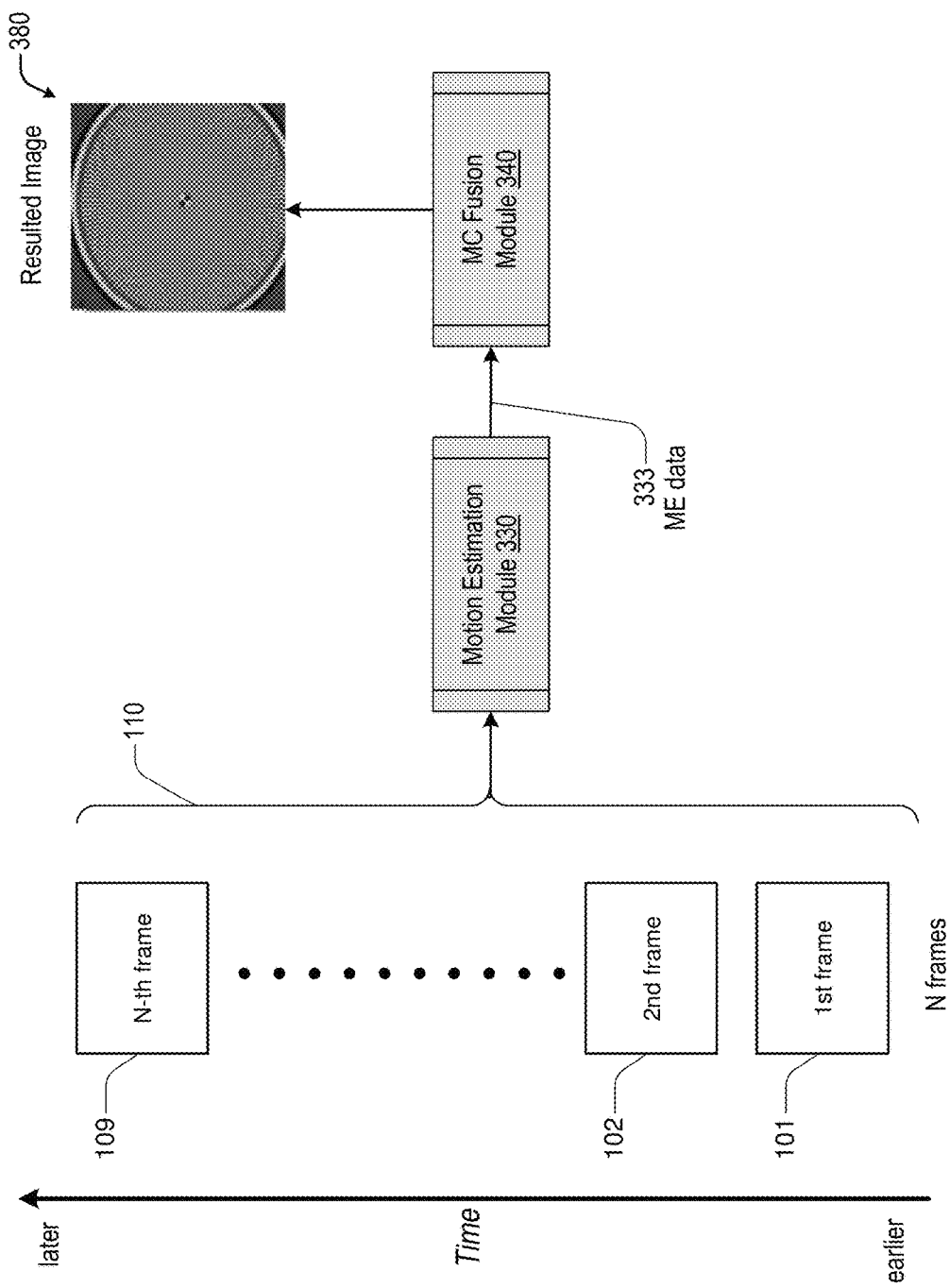
FIG. 3 is a diagram of an example design in accordance with an implementation of the present disclosure.

FIG. 3 is a diagram of an example design in accordance with an implementation of the present disclosure, wherein a motion-compensated (MC) fusion module 340 is configured to perform a MC fusion process that is capable of reducing blurriness caused by the dynamic objects in the multi-frame data 110. The MC fusion module 340 does not perform the MC fusion process all by itself. Instead, the MC fusion module 340 operates on ME data 333 received from a motion estimation (ME) module 330, which generates the ME data 333 based on the multi-frame data 110. Namely, the ME module 330 and the MC fusion module 340 collectively perform the MC fusion process. Specifically, the ME module 330 applies blocked-based motion estimation techniques that are commonly employed in interframe video coding, especially the ones using block-matching algorithms, to identify relative motion relationships (e.g., shift, rotation, pan, etc.) of various dynamic objects in the scene 195 as shown in the N frames of the multi-frame data 110. The MC fusion module 340 subsequently utilizes the identified motion relationships between the N frames to compensate for the motion of the dynamic objects so that a resulted output image 380 may show the dynamic object as clear rather than blurry.

To completely identify the relative motion relationships among the N frames, a total number of (N−1) motion estimation rounds are required, with each round performed between two of the N frames. In some embodiments, one of the N frames is chosen as a baseline frame, and the ME module 330 is to identify the motion relationship between the baseline frame and each of the rest (N−1) frames. In some embodiments, the ME module 330 is to identify the motion relationship between any pair of two temporally adjacent frames of the multi-frame data 110, with the N frames forming (N−1) temporally adjacent two-frame pairs.

Both the motion estimation process performed by the ME module 330 and the motion-compensated fusion process performed by the MC fusion module 340 are block-based, i.e., operated block by block. For example, to perform motion estimation between two of the N frames of the multi-frame data 110 as stated above, a first of the two frames is divided into a plurality of non-overlapping prediction blocks, with each prediction block being a rectangular region of the first of the two frames. For each of the prediction blocks, the ME module 330 finds within the second of the two frames a best-matching block that mostly resembles the respective prediction block, whereas the best-matching block has the same size as the respective prediction block. A motion vector (MV) corresponding to the respective prediction block is then found as the MV representing the shift between the respective prediction block and the best-matching block.

The best-matching block may be found using an integer pixel search algorithm within a certain search range of the second of the two frames. As indicated by the word "search", the ME module 330 will examine all candidate blocks within that search range, and then find the candidate block that has the least amount of difference (e.g., lowest distortion) among the candidate blocks as compared to the prediction block of the first of the two frames. In an event that the two frames are temporally adjacent frames in the multi-frame data 110, the candidate blocks are often a displaced version of the prediction block. Each of the candidate blocks is of the same size (i.e., width and height) as the prediction block. For integer pixel search, the candidate blocks differ from each other by one pixel in either horizontal direction or vertical direction.

To find the best-matching block, the ME module 330 calculates difference between each candidate block and the prediction block. A loss value may be used to represent the difference between each candidate block and the prediction block, with a smaller loss value indicating a closer resemblance. In some embodiments, the loss value may be calculated using error matrices such as sum of squared differences (SSD) or sum of absolute differences (SAD) across all block pixels of a particular candidate block. The candidate block having the smallest loss value is the one that matches the prediction block best, and thus the best-matching block. Accordingly, the integer pixel search algorithm determines, for each prediction block, a respective ME result, which includes the best-matching block itself and the loss value associated with the best-matching block. In some embodiments, the respective ME result may additionally include the motion vector corresponding to the best-matching block, the magnitude of the motion vector, or both. The loss value associated with the best-matching block may also be referred as the loss value associated with the motion vector corresponding to the prediction block that the best-matching block matches best to, as there exists one-to-one correspondence between the motion vector and the best-matching block for a given prediction block. All the block-based ME results generated from the motion estimation process among the N frames of the multi-frame data 110 are collectively represented by the ME data 333.

In some embodiments, a hierarchical pixel search approach comprising integer pixel search and fractional pixel search may be employed by the ME module 330. That is, one or more additional fractional pixel search steps may follow the integer pixel search step, which enables the ME module 330 to find even better matching blocks as compared to those found using only integer pixel search. The operation of fractional pixel search is similar to that of integer pixel search, except that the candidate blocks differ from each other by a fraction of a pixel in either horizontal direction or vertical direction.

Taking the ME data 333 as input, the MC fusion module 340 combines the best-matching blocks of the ME data 333 to generate the output image 380. Specifically, the MC fusion module 340 generates the output image 380 by calculating a block-by-block weighted sum or weighted average over the best-matching blocks, wherein all pixels of a block share a same weight. Moreover, the same weight may be determined based on some of the ME data 333, e.g., the loss value or the motion vector. In general, a larger magnitude of the motion vector corresponding to a prediction block and/or a greater loss value associated with the motion vector may be an indication that the best-matching block is quite different from the prediction block, which may in turn be an indication of a dynamic object presented within the block. Accordingly, the MC fusion module 340 may thus assign a smaller weight when incorporating the block in the weighted sum or average, so as to reduce the potential blurriness caused by the dynamic object. In some embodiments, the MC fusion module 340 may assign weights for the blocks such that the weight of a block has a negative correlation with the magnitude of the motion vector corresponding to the respective block. In some other embodiments, the MC fusion module 340 may assign weights for the blocks such that the weight of a block has a negative correlation with the loss value associated with motion vector corresponding to the respective block.

It is worth noting that, while the MC fusion approach of FIG. 3 is able to provide a superior image quality as compared to the temporal fusion approach of FIG. 1 especially in terms of the capability of reducing blurriness caused by dynamic objects, the MC fusion process delivers the superior image quality with a much higher operation overhead that is manifested in longer computation time, lower throughput, higher hardware cost, greater power consumption, among others. This is because the block-based ME process and the MC fusion process, performed by the ME module 330 and the MC fusion module 340, respectively, impose much greater computation requirements in both complexity and load (e.g., by an order of magnitude or more). While able to provide satisfactory results for dynamic objects, the MC fusion approach of FIG. 3 may be an overkill and thus inefficient for static objects.

III. Hybrid Fusion

Figure 4:
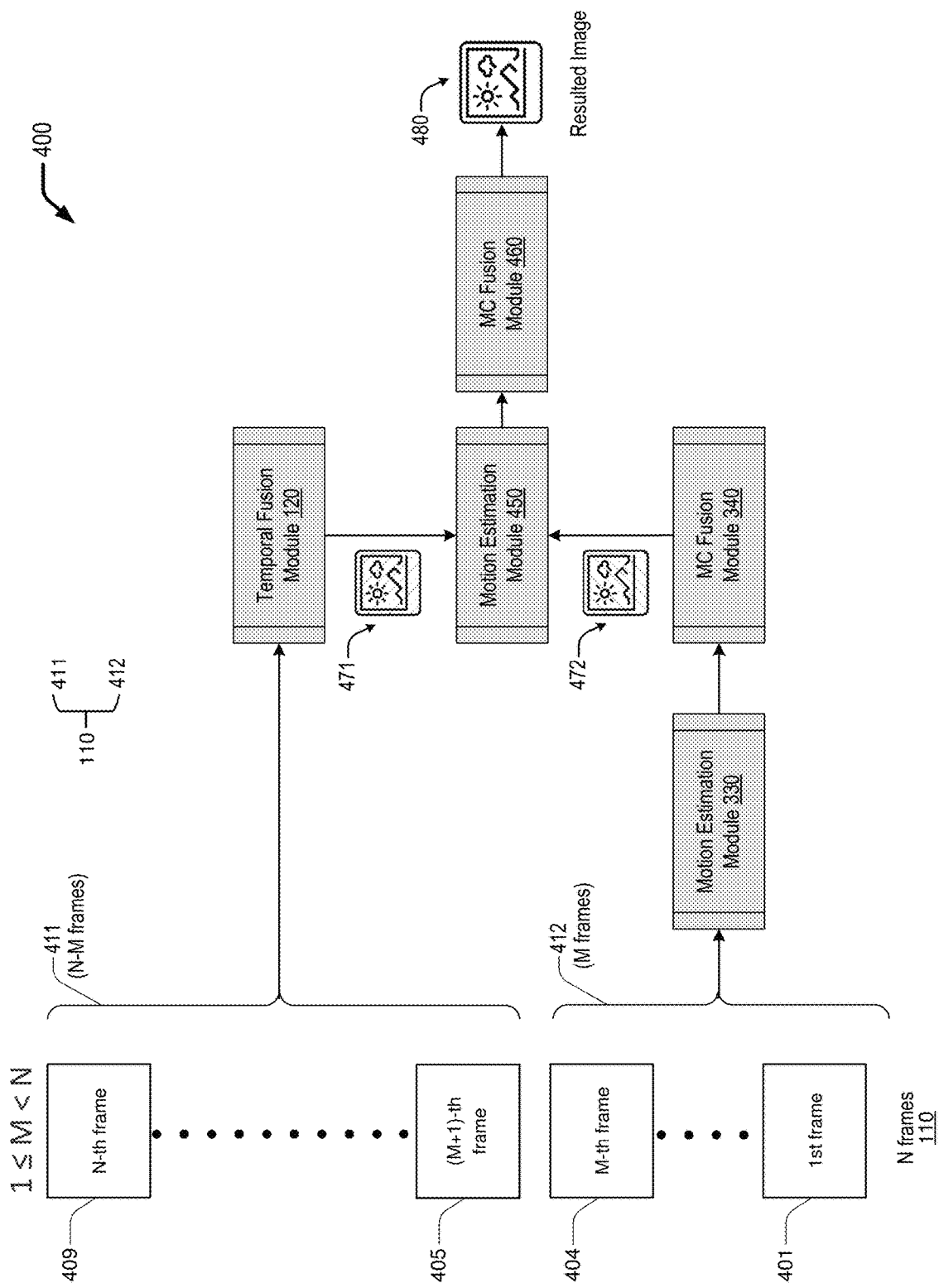
FIG. 4 is a diagram of an example design in accordance with an implementation of the present disclosure.

FIG. 4 is a diagram of an example design in accordance with an implementation of the present disclosure, which illustrates a hybrid fusion approach 400 that aims to achieve a proper balance between the MC fusion approach of FIG. 3 (which is costly but capable of treating dynamic objects in a scene) and the temporal fusion approach of FIG. 1 (which is low-cost but sufficient for treating static objects in the scene). Different from the temporal fusion approach of FIG. 1 and the MC fusion approach of FIG. 3, the hybrid fusion approach 400 separates the multi-frame data 110 in two parts, i.e., a first part 411 and a second part 412. As shown in FIG. 4, the second part 412 includes a total of M frames, whereas the first part 411 includes the remaining (N-M) frames, given that 1≤M≤N. The frames of the first part 411 are sent to the temporal fusion module 120 for generating a first intermediate image 471, whereas the frames of the second part 412 are sent to the ME module 330 followed by the MC fusion module 340 for generating a second intermediate image 472.

As shown in FIG. 4, the hybrid fusion approach 400 involves the temporal fusion module 120 generating the first intermediate image 471 by performing temporal fusion based on the frames in the first part 411. Consequently, the first intermediate image 471 may achieve significant noise reduction, especially in regions having only static objects, but may show blurriness in regions having dynamic objects. The image 252 may be an example of the first intermediate image 471 under a condition of N=64 and M=32. The hybrid approach 400 also involves the ME module 330 and the MC fusion module 340 generating the second intermediate image 472 by performing motion-compensated fusion based on the frames in the second part 412. Consequently, the second intermediate image 472 may achieve image clarity even in regions having dynamic objects.

The first intermediate image 471 and the second intermediate image 472 may subsequently be passed to another ME module 450 followed by a MC fusion module 460 for generating an output image 480. The ME module 450 and the MC fusion module 460 may perform a similar MC fusion process as the ME module 330 and the MC fusion module 340 perform, only with two frames as input, i.e., the first intermediate image 471 and the second intermediate image 472. The ME module 450 and the MC fusion module 460 also perform their respective functions using a block-based approach, similar to what is described elsewhere herein above regarding the ME module 330 and the MC fusion module 340. That is, each of the intermediate images 471 and 472 may be divided into non-overlapping blocks for being processed by the ME module 450 and the MC fusion module 460, similar to how the frames of multi-frame data 110 and 412 are divided into the non-overlapping blocks for being processed by the ME module 330 and the MC fusion module 340.

It is to be noted that, in the hybrid fusion approach 400, the intermediate images 471 and 472 may be divided differently from how the frames 412 are divided. For example, the frames 412 may be divided into non-overlapping blocks of a first size, whereas the intermediate images 471 and 472 may be divided into non-overlapping blocks of a second size that is same or different from the first size. In some embodiments the first size may be larger than the second size, whereas in some alternative embodiments the first size may be smaller than the second size. In yet some other embodiments, different areas of the picture may be divided into different sizes of blocks. That is, for some areas of the resulted image 480, the corresponding areas of each of the frames 412 and/or the each of the intermediate images 471 and 472 may have a finer division and be divided into smaller blocks compared with other areas of the resulted image 480. Typically, an area containing whole or partial of a dynamic object is divided into smaller blocks compared with an area containing whole or partial of a relatively static object.

By properly setting the parameter M, the hybrid fusion approach 400 is capable of reducing the computation overhead resulted from the MC fusion process. Compared with the of (N−1) rounds of motion estimation required in the FIG. 3 approach, the hybrid fusion approach 400 reduces the required motion estimation to M rounds, i.e., (M−1) rounds performed by the ME module 330 plus 1 round performed by the ME module 450 between the first intermediate image 471 and the second intermediate image 472. In an event that M is set to a number less than N/2, the computation overhead associated with the block-based motion estimation process would be reduced by more than 50%, a significant improvement over the FIG. 3 approach.

The hybrid fusion approach 400 has been verified to be practically feasible even with M set to a value much lower than N/2. As illustrated below, the hybrid fusion approach 400 with a setting of N=64 and M=6 still yields satisfactory results. The setting translates to over 90% reduction in the motion estimation related computation overhead as compared to that of the FIG. 3 approach. Therefore, an M setting lower than N/2 is feasible and preferred. Namely, the first part 411 is preferred to have more frames than the second part 412. From the viewpoint of computation overhead reduction, a lower value of M is preferred.

Figure 5:
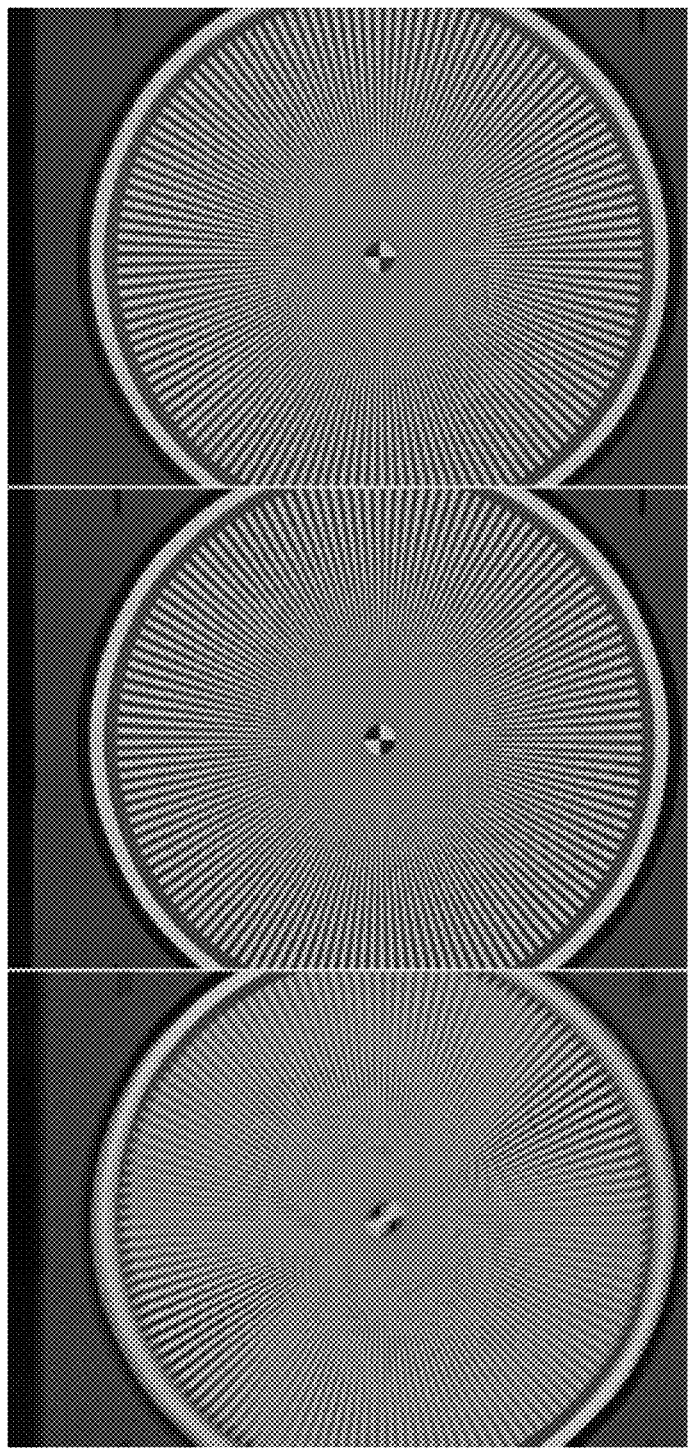
FIG. 5 is a diagram demonstrating an area of an exemplary output image resulted from the example design in of FIG. 4.
Figure 6:
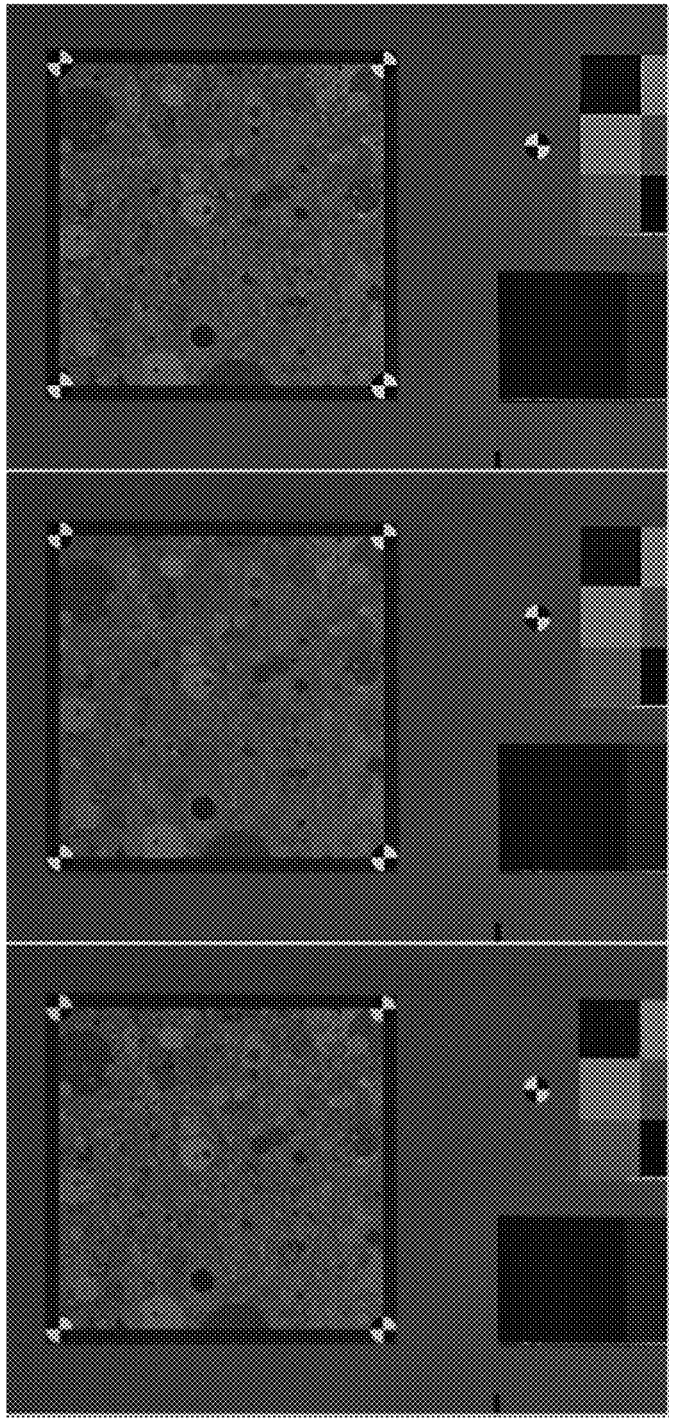
FIG. 6 is a diagram demonstrating another area of the exemplary output image resulted from the example design in of FIG. 4.

Each of FIG. 5 and FIG. 6 is a diagram demonstrating a respective area of an exemplary output image generated using the hybrid fusion approach 400. Specifically, the setting of N=64 and M=6 is applied in generating FIGS. 5 and 6. That is, the first part 411 includes 58 frames, whereas the second part 412 includes 6 frames. FIG. 5 includes three diagrams 571, 572 and 580, each of which illustrates a same area of the first intermediate image 471, the second intermediate image 472, and the output image 480, respectively. Moreover, the specific area includes dynamic objects. As shown in FIG. 5, the diagram 571 illustrates that the first intermediate image 471, a result of temporal fusion over 58 frames, exhibits poor image quality, as most of the area is blurred by the dynamic objects therein. In contrast, the diagram 572 illustrates that the second intermediate image 472, a result of MC fusion over merely 6 frames, exhibits great image quality with little blurriness caused by the dynamic objects. The diagram 580 illustrates the same area of the output image 480, which is generated by a MC fusion process performed by the ME module 450 and 460, and with the diagrams 571 and 572 as input. Apparently, with the hybrid fusion approach 400, the blurriness in the diagram 571 is greatly reduced in the diagram 580, whereas the noise level in the diagram 580 is comparable to, and even slightly reduced, from the noise level in the diagram 572.

FIG. 6 includes three diagrams 671, 672 and 680, each of which illustrates a same area of the first intermediate image 471, the second intermediate image 472, and the output image 480, respectively. Moreover, the specific area includes mostly static objects and little or no dynamic objects. As shown in FIG. 6, the diagram 671 illustrates that the first intermediate image 471, a result of temporal fusion over 58 frames, exhibits decent image quality, as the noise points are few and texture details are shown. In contrast, the diagram 672 illustrates that the second intermediate image 472, a result of MC fusion over 6 frames, exhibits poorer image quality with more noise points and less texture details. The diagram 680 illustrates the same area of the output image 480, which is generated by a MC fusion process performed by the ME module 450 and 460, and with the diagrams 671 and 672 as input. Apparently, with the hybrid fusion approach 400, the noise level in the diagram 672 is greatly reduced in the diagram 680, which exhibits a comparable or even slightly lower noise as compared to the diagram 671. One can conclude from FIG. 5 and FIG. 6 that hybrid fusion with a setting of N=64 and M=6 is sufficient to achieve satisfactory image quality of both static and dynamic objects.

Figure 7:
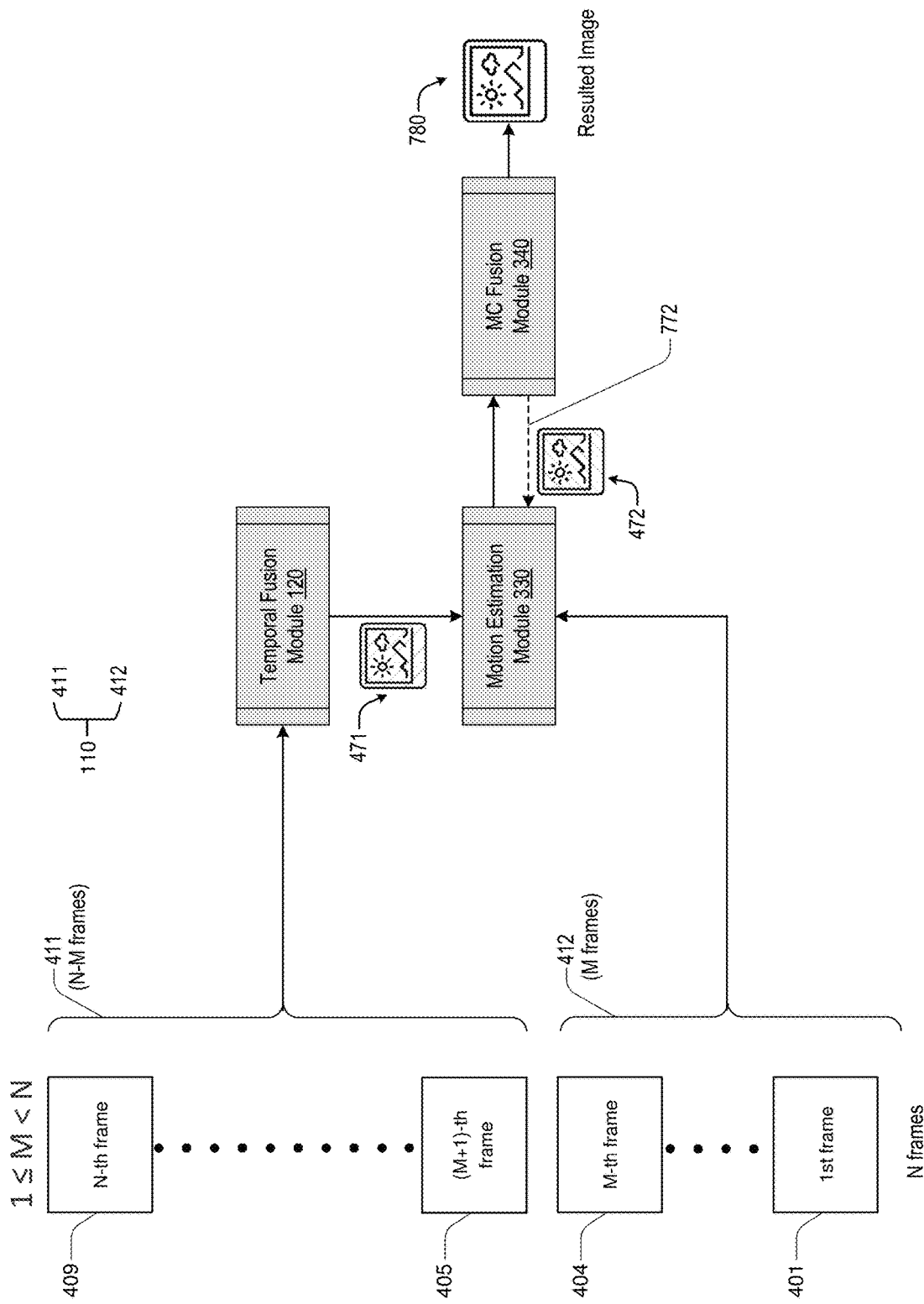
FIG. 7 is a diagram of an example design in accordance with an implementation of the present disclosure.

Refer to FIG. 4. In some embodiments, the ME modules 330 and 450 may be embodied by two separate instances of a same apparatus. Similarly, the MC fusion modules 340 and 460 may also be embodied by two separate instances of a same apparatus. In an alternative approach, however, the ME modules 330 and 450 may be embodied by one apparatus, and the MC fusion modules 340 and 460 may also be embodied one apparatus. FIG. 7 is a diagram of an example design in accordance with an implementation of the present disclosure, wherein the ME module 330 is reused in place of the ME module 450, and wherein the MC fusion module 340 is reused in place of the MC fusion module 460. To achieve this end, a data path 772 is activated. Moreover, the ME module 330 and the MC fusion module 340 operate in two consecutive iterations, each iteration receiving different data as input and generating different output. Firstly, the ME module 330 performs motion estimation with the M frames of the second part 412 as input and outputs the ME results (e.g., the ME data 333) to the MC fusion module 340. The MC fusion module 340 receives the ME results and accordingly generates the second intermediate image 472. The second intermediate image 472 is send back to the ME module 330 via the data path 772. Secondly, the ME module 330 receives the second intermediate image 472 and the first intermediate image 471 as input, performs motion estimation accordingly, and pass the ME results thereof to the MC fusion module 340, which generates the output image 780. In the alternative approach, the resulted output image 780 is identical to the output image 480 generated by the hybrid fusion approach 400, because the two approaches are identical except for the reuse of the ME module 330 and the MC fusion module 340.

In some embodiments, a slightly different and more efficient approach may be realized, wherein the ME module 330 and the MC fusion module 340 only need to operate in one pass instead of in two consecutive rounds as described above. In this one-pass approach, the data path 772 is not activated, and the second intermediate image 472 would not be generated. The ME module 330 receives the first intermediate image 471 as well as the M frames of the second part 412 as input and outputs the ME results to the MC fusion module 340. With the (M+1) images as input, the ME results include data generated from M rounds of motion estimation. The MC fusion module 340 generates the output image 780 in a way similar to how the output image 480 is generated in the hybrid fusion approach 400, with an only exception that all the (M+1) images are processed in together in one pass. In contrast, the hybrid fusion approach 400 processes the M frames of the second part 412 in a first round to generate the second intermediate image 472, and then processes the first and second intermediate images 471 and 472 in a second round to generate the output image 480. Due to this difference, the output image 780 may be slightly different from the output image 480 generated by the hybrid fusion approach 400.

In some embodiments, the second part 412 may include the earliest M frames captured in the multi-frame data 110. Namely, the M frames of the second part 412 may include frames 401 and 404, whereas the frame 401 is the first frame 101 of FIG. 1, and the frame 404 is the M-th frame captured along the timeline 199. On the other hand, the (N-M) frames of the first part 411 may include the rest of the frames of the multi-frame data 110, such as frames 405 and 409, whereas the frame 409 is the last frame 109 captured along the timeline 199, and the frame 405 is the (M+1)-th frame of the multi-frame data 110, captured immediately after the M-th frame 404.

In some embodiments, M is set to one, i.e., M=1. This means the second part 412 has only one frame, and all the rest of (N−1) frames are in the first part 411. It follows that the ME module 330 only needs to perform motion estimation once, with the input being the first intermediate image 471 and the lone frame that belongs to the second part 412.

IV. Illustrative Implementations

Figure 8:
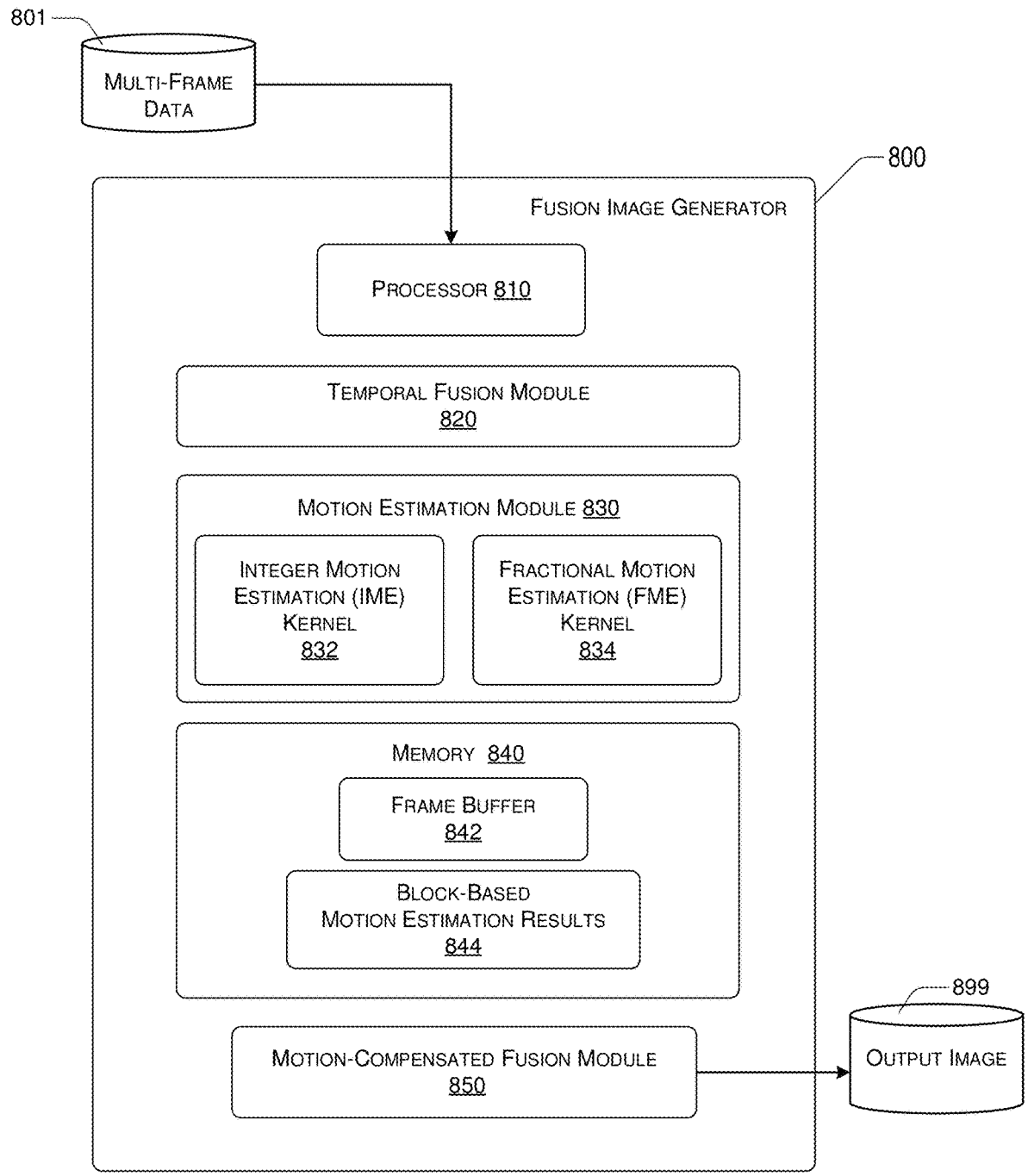
FIG. 8 is a diagram of an example fusion image generating apparatus in accordance with an implementation of the present disclosure.

FIG. 8 illustrates an example apparatus 800 capable of generating a digital image using the hybrid fusion approach described above. As illustrated, the apparatus 800 receives multi-frame data 801 that represents real-world objects, and accordingly generates an output image 899 with reduced noise and blurriness. The multi-frame data 801 may include a plurality of images of a scene that are consecutively captured during a period of time, whereas the output image 899 may be an embodiment of the output image 480 or 780. That is, the apparatus 800 may be used to realize hybrid fusion approaches illustrated in FIG. 4 and FIG. 7.

As illustrated, the apparatus 800 has several components or modules for processing the multi-frame data 801 into the output image 899, at least including some components selected from a processor 810, a temporal fusion module 820, a motion estimation (ME) module 830, memory 840, and a motion-compensated (MC) fusion module 850. The ME module 830 may include an integer motion estimation (IME) kernel 832 and a fractional motion estimation (FME) kernel 834. The memory 840 may include a frame buffer 842 for storing the multi-frame data 801 and intermediate processing images (e.g., the first and second intermediate images 471 and 472). The memory 840 may also include a buffer 844 for storing block-based motion estimation results (e.g., motion estimation data 333).

In some embodiments, the modules 810-850 as listed above are modules of software instructions being executed by one or more processing units (e.g., a processor) of a computing device or electronic apparatus. In some embodiments, the modules 810-850 are modules of hardware circuits implemented by one or more integrated circuits (ICs) of an electronic apparatus. Though the modules 810-850 are illustrated as being separate modules, some of the modules can be combined into a single module.

The processor 810 is configured to receive and analyze the multi-frame data 801 to identify or otherwise parse certain parameters of the multi-frame data 801, such as the capturing order and the number (i.e., the value of N) of the plurality of images of the multi-frame data 801. The processor 810 may also determine, based at least on the required image quality of the output image 899, how many of the plurality of images of the multi-frame data 801 are to be processed by the temporal fusion module 820 (i.e., the value of M). The processor 810 may further determine which images of the multi-frame data 801 are to be processed by the temporal fusion module 820 and which images of the multi-frame data 801 are to be processed by the ME module 830. Additionally, the processor 810 may store the plurality of images of multi-frame data 801 in the frame buffer 842.

The temporal fusion module 820 is configured to generate a first intermediate image (e.g., the first intermediate image 471) by performing temporal fusion based on a first part of the multi-frame data (e.g., the first part 411 of the multi-frame data 110). The temporal fusion module 820 may further store the first intermediate image in the frame buffer 842, which may be accessed by the MC fusion module 850. In some embodiments, the temporal fusion module 820 may be configured to generate the first intermediate image by calculating a pixel-by-pixel average of the images in the first part of the multi-frame data. The pixel-by-pixel average may be a simple mean average in some embodiments and a weighted average in some other embodiments. The temporal fusion module 820 may embody the temporal fusion module 120.

The ME module 830 is configured to perform block-based motion estimation on the first intermediate image and a second part of the multi-frame data (e.g., the second part 412 of the multi-frame data 110), thereby generating ME data (e.g., theme data 333) accordingly. The ME data may include motion vectors and/or associated loss values that are resulted from the block-based motion estimation. The ME module 830 may store the ME data in the buffer 844, which may be accessed by the MC fusion module 850. Specifically, the ME module 830 may divide the first intermediate image and each of the plurality of images of the second part of the multi-frame data into non-overlapping blocks. The ME module 830 may then determine a respective motion vector corresponding to each of the non-overlapping blocks by performing block-based motion estimation. The ME module 830 may further calculate a loss value associated with the respective motion vector for each of the non-overlapping blocks. The loss value represents the difference between each non-overlapping block and a corresponding inter-frame block that resembles it, with a smaller loss value indicating a closer resemblance. In some embodiments, the ME module 830 may calculate the loss value using error matrices such as sum of squared differences (SSD) or sum of absolute differences (SAD) across all block pixels of the respective block. Moreover, the IME kernel 832 is configured to perform integer pixel search, whereas the FME kernel 834 is configured to perform fractional pixel search. Both the integer pixel search and the fractional pixel search are essential functions of the ME module 830. The ME module 830 may embody the ME module 330 and the ME module 450.

The MC fusion module 850 is configured to generate the output image 899 by performing MC fusion based on the first intermediate image (e.g., the first intermediate image 471) and the second part of the multi-frame data (e.g., the second part 412 of the multi-frame data 110). To this end, the MC fusion module 850 may access memory 840 to access data stored in buffers 842 and 844. In some embodiments, the MC fusion module 850 may generate the output image 899 by performing MC fusion directly on the first intermediate image and the second part of the multi-frame data in one pass. In some alternative embodiments, the MC fusion module 850 may generate the output image 899 in two passes. Firstly, the MC fusion module 850 may perform motion-compensated fusion based on the second part of the multi-frame data to generate a second intermediate image (e.g., the second intermediate image 472). Secondly, the MC fusion module 850 may subsequently perform motion-compensated fusion based on the first intermediate image and the second intermediate image to generate the output image 899. The MC fusion module 850 may embody the MC fusion module 340 and the MC fusion module 460.

V. Illustrative Processes

Figure 9:
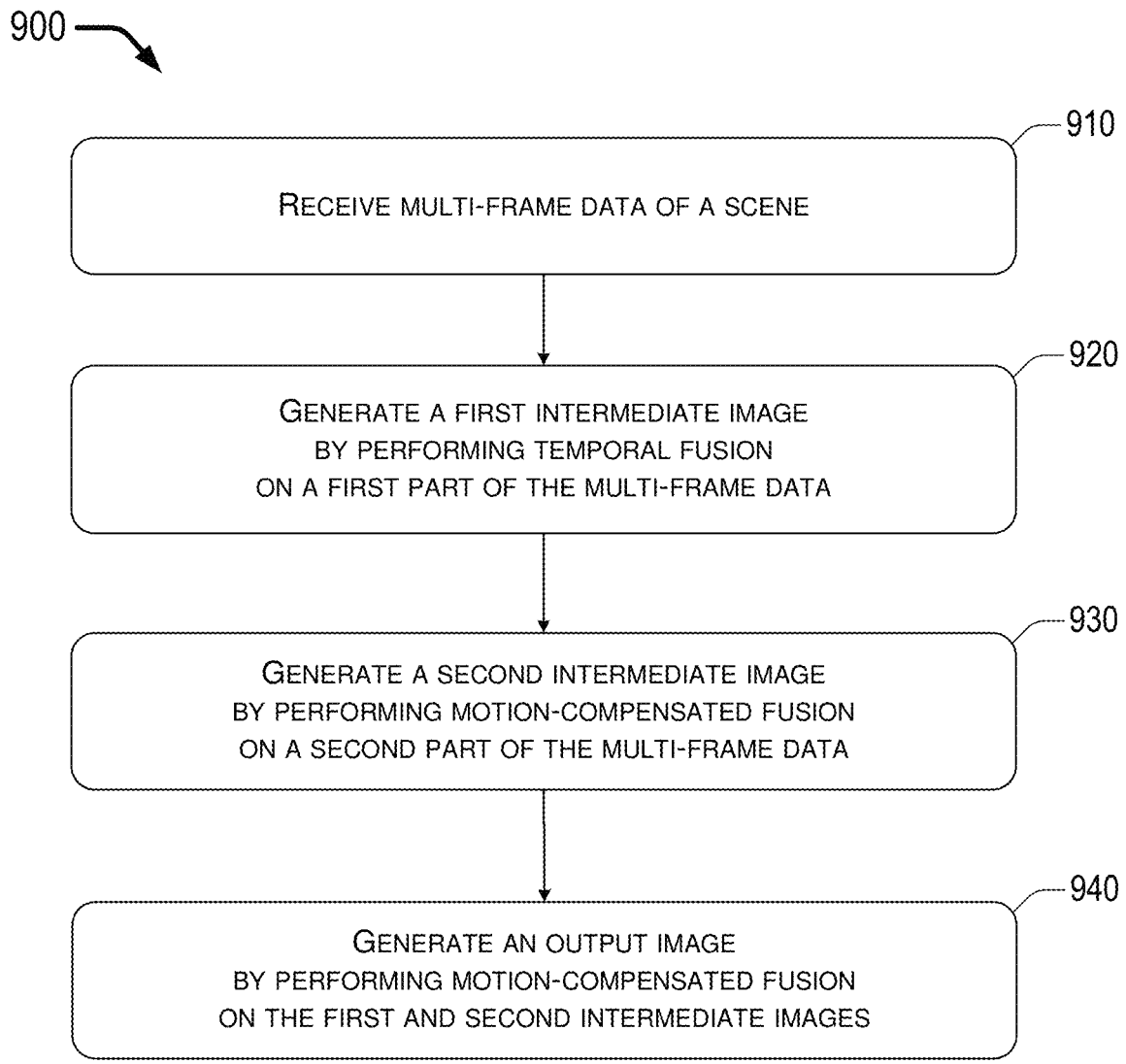
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to generating an output image of a scene based on multi-frame data of the scene in accordance with the present disclosure. Process 900 may include one or more operations, actions, or functions as illustrated by one or more of blocks 910, 920, 930 and 940. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in the apparatus 800 as well as any variations thereof. Solely for illustrative purposes and without limiting the scope, process 900 are described below in the context of the apparatus 800. Process 900 may begin at block 910.

At 910, process 900 may involve the processor 810 of the apparatus 800 receiving multi-frame data of a scene (e.g., the scene 195). The multi-frame data (e.g., the multi-frame data 110) may include a plurality of images of the scene that are consecutively captured during a period of time (i.e., the exposure time as indicated by the timeline 199. The multi-frame data may be captured by an apparatus (e.g., the digital camera 191) in response to a single triggering of a button or a switch thereon. Process 900 may proceed from 910 to 920.

At 920, process 900 may involve the temporal fusion module 820 generating a first intermediate image (e.g., the first intermediate image 471) by performing temporal fusion based on a first part of the multi-frame data (e.g., the N-M frames of the first part 411 of the multi-frame data 110). The temporal fusion module 820 may generate the first intermediate image by calculating a pixel-by-pixel sum or average of the first number of the plurality of images. The number of frames in the first part of the multi-frame data is preferred to be the majority of the images in the multi-frame data of the scene. In some embodiments, the first part of the multi-frame data comprises the images captured immediately following a start of the exposure time. The temporal fusion module 820 may store the first intermediate image in the frame buffer 842 for later access by the FC fusion module 850. Process 900 may proceed from 920 to 930.

At 930, process 900 may involve the FC fusion module 850 generating a second intermediate image (e.g., the second intermediate image 472) by performing motion-compensated fusion based on the second part of the multi-frame data (e.g., the M frames of the second part 412 of the multi-frame data 110). In the performing of the motion-compensated fusion, the FC fusion module 850 may access data stored in buffers 842 and 844. Specifically, the FC fusion module 850 may fetch from the frame buffer 842 the second part of the multi-frame data, which is stored by the processor 810. Moreover, the FC fusion module 850 may fetch from the buffer 844 the motion estimation data resulted from motion estimation performed by the ME module 830 with the second part of the multi-frame data. The FC fusion module 850 may generate the second intermediate image by calculating a block-by-block weighted average of the images in the second part of the multi-frame data. The weights used in calculating the block-by-block weighted average may be based on block-based ME results stored in the buffer 844, including the block-based motion vectors and/or the block-based loss values. In some embodiments, the weights may have a negative correlation with the loss values or the magnitudes of the motion vectors. The FC fusion module 850 may store the second intermediate image in the frame buffer 842 for later access. Process 900 may proceed from 930 to 940.

At 940, process 900 may involve the FC fusion module 850 generating the output image 899 by performing motion-compensated fusion based on the first intermediate image and the second intermediate image. To this end, the FC fusion module 850 may calculate a block-by-block weighted average of the first and second intermediate images based on the motion vectors and/or the loss values associated with the motion vectors, or both, that are stored in the buffer 844. In some embodiments, the weights used in calculating the block-by-block weighted average may have a negative correlation with the loss values or the magnitudes of the motion vectors.

Figure 10:
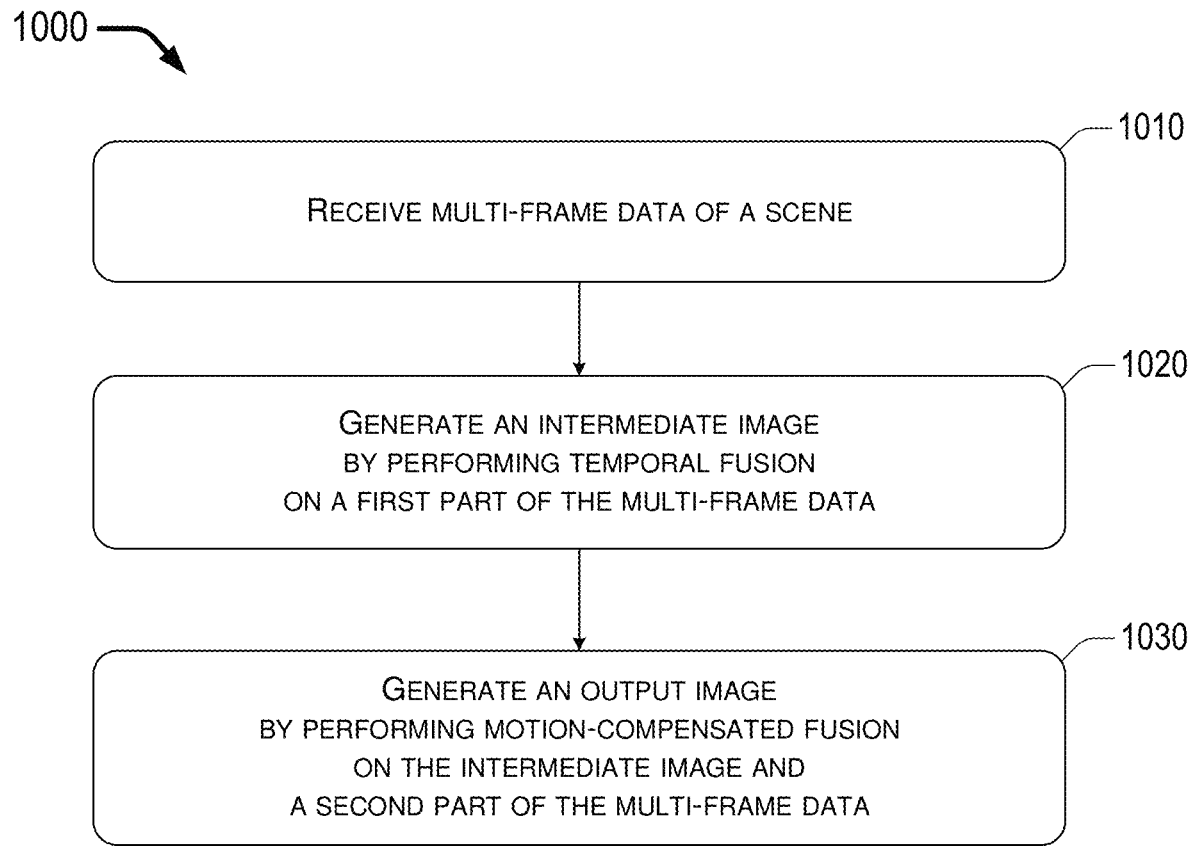
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to generating an output image of a scene based on multi-frame data of the scene in accordance with the present disclosure. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in the apparatus 800 as well as any variations thereof. Solely for illustrative purposes and without limiting the scope, process 1000 are described below in the context of the apparatus 800. Process 1000 may begin at block 1010.

At 1010, process 1000 may involve the processor 810 of the apparatus 800 receiving multi-frame data of a scene (e.g., the scene 195). The multi-frame data (e.g., the multi-frame data 110) may include a plurality of images of the scene that are consecutively captured during a period of time (i.e., the exposure time as indicated by the timeline 199. The multi-frame data may be captured by an apparatus (e.g., the digital camera 191) in response to a single triggering of a button or a switch thereon. Process 1000 may proceed from 1010 to 1020.

At 1020, process 1000 may involve the temporal fusion module 820 generating an intermediate image (e.g., the first intermediate image 471) by performing temporal fusion based on a first part of the multi-frame data (e.g., the N-M frames of the first part 411 of the multi-frame data 110). The temporal fusion module 820 may generate the intermediate image by calculating a pixel-by-pixel sum or average of the first number of the plurality of images. The number of frames in the first part of the multi-frame data is preferred to be the majority of the images in the multi-frame data of the scene. In some embodiments, the first part of the multi-frame data comprises the images captured immediately following a start of the exposure time. The temporal fusion module 820 may store the intermediate image in the frame buffer 842 for later access by the FC fusion module 850. Process 1000 may proceed from 1020 to 1030.

At 1030, process 1000 may involve the FC fusion module 850 generating the output image 899 by performing motion-compensated fusion based on the intermediate image (e.g., the first intermediate image 471) and the second part of the multi-frame data (e.g., the M frames of the second part 412 of the multi-frame data 110). To this end, the FC fusion module 850 may calculate a block-by-block weighted average of the intermediate image and the images in the second part of the multi-frame data based on the motion vectors and/or the loss values associated with the motion vectors, or both, that are stored in the buffer 844 by the ME module 830. Specifically, the FC fusion module 850 may fetch from the frame buffer 842 the second part of the multi-frame data, which is stored by the processor 810, as well as the intermediate image, which is stored by the temporal fusion module 820. The FC fusion module 850 may accordingly generate the output image 899 by calculating a block-by-block weighted average of the intermediate image and the plurality of images in the second part of the multi-frame data. The weights used in calculating the block-by-block weighted average may be based on block-based ME results generated by the ME module 830, including the block-based motion vectors and/or the block-based loss values. In some embodiments, the weights may have a negative correlation with the loss values or the magnitudes of the motion vectors.

VI. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
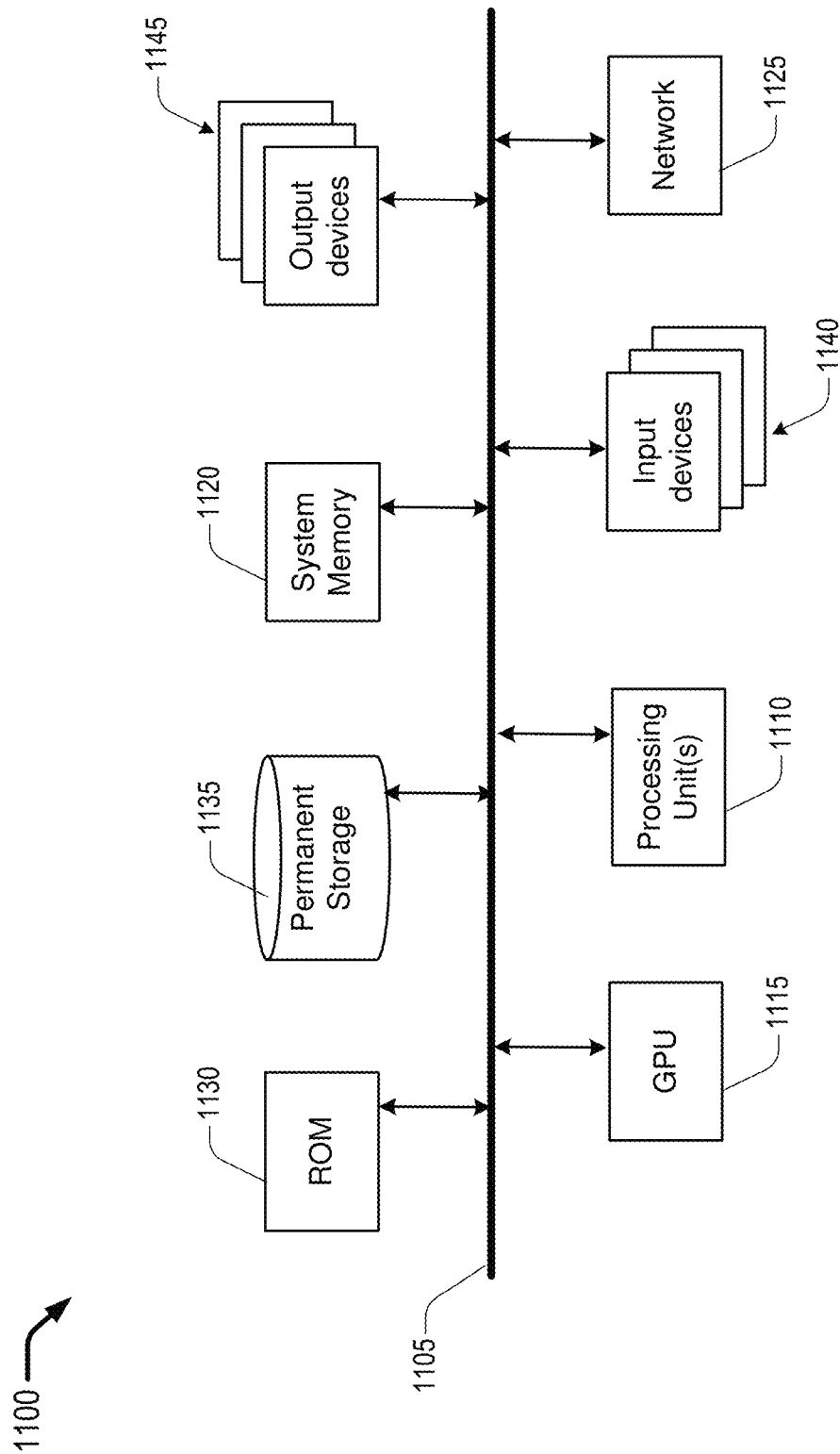
FIG. 11 is a diagram of an example electronic system in accordance with an implementation of the present disclosure.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals. While the present disclosure has been described with reference to numerous specific details, one of ordinary skill in the art will recognize that the present disclosure can be embodied in other specific forms without departing from the spirit of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving multi-frame data of a scene, the multi-frame data comprising a plurality of N images of the scene that are consecutively captured during a period of time;
   separating the multi-frame data into a first part and a second part, wherein a first M images of the plurality of N images form the second part, and a subsequent (N-M) images of the plurality of N images form the first part;
   generating a first intermediate image by performing temporal fusion on the first part of the multi-frame data; and
   generating an output image of the scene by performing motion-compensated fusion based on the first intermediate image and the second part of the multi-frame data, wherein N and M are positive integers, and N is greater than M.

2. The method of claim 1, wherein the performing of the temporal fusion comprises calculating a pixel-by-pixel average of the (N-M) images.

3. The method of claim 1, wherein the performing of the motion-compensated fusion comprises:
   dividing the first intermediate image and each image of the second part of the multi-frame data into non-overlapping blocks;
   determining a respective motion vector corresponding to each of the non-overlapping blocks by performing block-based motion estimation;
   calculating a loss value associated with the respective motion vector for each of the non-overlapping blocks; and
   generating the output image by calculating a block-by-block weighted average of the first intermediate image and the second part of the multi-frame data based on the motion vectors corresponding to the non-overlapping blocks, the loss values associated with the motion vectors, or both.

4. The method of claim 1, wherein the first part includes more images than the second part.

5. The method of claim 1, wherein the generating of the output image comprises:
   generating a second intermediate image by performing the motion-compensated fusion based on the second part of the multi-frame data; and
   generating the output image by performing the motion-compensated fusion based on the first intermediate image and the second intermediate image.

6. The method of claim 5, wherein the generating of the second intermediate image comprises:
   dividing each image of the second part of the multi-frame data into non-overlapping blocks;
   determining a respective motion vector corresponding to each of the non-overlapping blocks by performing block-based motion estimation; and
   generating the second intermediate image by calculating a block-by-block weighted average of the second part of the multi-frame data based on the motion vectors corresponding to the non-overlapping blocks.

7. The method of claim 6, wherein a weight of each of the non-overlapping blocks used in calculating the block-by-block weighted average has a negative correlation with a magnitude of the respective motion vector.

8. The method of claim 5, wherein the generating of the output image comprises:
   dividing each of the first and second intermediate images into non-overlapping blocks;
   determining a respective motion vector corresponding to each of the non-overlapping blocks by performing block-based motion estimation;
   calculating a loss value associated with the respective motion vector for each of the non-overlapping blocks; and
   generating the output image by calculating a block-by-block weighted average of the first and second intermediate images based on the motion vectors corresponding to the non-overlapping blocks, the loss values associated with the motion vectors, or both.

9. The method of claim 8, wherein a weight of each of the non-overlapping blocks used in calculating the block-by-block weighted average has a negative correlation with the loss value.

10. An apparatus, comprising:
    a processor configured to receive multi-frame data of a scene, the multi-frame data comprising a plurality of N images of the scene that are consecutively captured during a period of time;

a temporal fusion module configured to obtain a first part of the multi-frame data and generate a first intermediate image by performing temporal fusion on the first part of the multi-frame data; and a motion-compensated (MC) fusion module configured to obtain a second part of the multi-frame data and generate an output image of the scene by performing motion-compensated fusion based on the first intermediate image and the second part of the multi-frame data, wherein a first M images of the plurality of N images form the second part, and a subsequent (N-M) images of the plurality of N images form the first part, wherein N and M are positive integers, and N is greater than M.

11. The apparatus of claim 10, wherein the temporal fusion module is configured to generate the first intermediate image by calculating a pixel-by-pixel average of the (N-M) images.

12. The apparatus of claim 10, further comprising:
a motion estimation (ME) module configured to deliver ME data to the MC fusion module by performing operations including:
dividing the first intermediate image and each image of the second part of the multi-frame data into non-overlapping blocks;
determining a respective motion vector corresponding to each of the non-overlapping blocks by performing block-based motion estimation; and
calculating a loss value associated with the respective motion vector for each of the non-overlapping blocks,
wherein the ME data comprises the motion vector or the loss value of each of the non-overlapping blocks.

13. The apparatus of claim 10, wherein the first part includes more images than the second part.

14. The apparatus of claim 10, wherein the MC fusion module is configured to generate the output image by performing operations including:
generating a second intermediate image by performing the motion-compensated fusion based on the second part of the multi-frame data; and
generating the output image by performing the motion-compensated fusion based on the first intermediate image and the second intermediate image.

15. The apparatus of claim 14, further comprising:
a motion estimation (ME) module configured to deliver ME data to the MC fusion module by performing operations including:
dividing each image of the second part of the multi-frame data into non-overlapping blocks;
determining a respective motion vector corresponding to each of the non-overlapping blocks by performing block-based motion estimation; and
generating the second intermediate image by calculating a block-by-block weighted average of the second part of the multi-frame data based on the motion vectors corresponding to the non-overlapping blocks.

16. The apparatus of claim 15, wherein the MC fusion module is configured to calculate the block-by-block weighted average using a respective weight for each of the non-overlapping blocks, and wherein the respective weight has a negative correlation with a magnitude of the respective motion vector.

17. The apparatus of claim 14, wherein the MC fusion module is configured to generate the output image by performing operations including:
dividing each of the first and second intermediate images into non-overlapping blocks;
determining a respective motion vector corresponding to each of the non-overlapping blocks by performing block-based motion estimation;
calculating a loss value associated with the respective motion vector for each of the non-overlapping blocks; and
generating the output image by calculating a block-by-block weighted average of the first and second intermediate images based on the motion vectors corresponding to the non-overlapping blocks, the loss values associated with the motion vectors, or both.

18. The apparatus of claim 17, wherein the MC fusion module is configured to calculate the block-by-block weighted average using a respective weight for each of the non-overlapping blocks, and wherein the respective weight has a negative correlation with a magnitude of the loss value.

19. The method of claim 1, wherein a weight of each image of the first part of the multi-frame data is associated with a capturing time.

20. The method of claim 1, wherein at least one image belonging to the second part of the multi-frame data is captured before at least one image belonging to the first part of the multi-frame data.

21. The method of claim 1, wherein all images belonging to the second part of the multi-frame data are captured before any image belonging to the first part of the multi-frame data.

* * * * *